United States Patent Office 3,676,261
Patented July 11, 1972

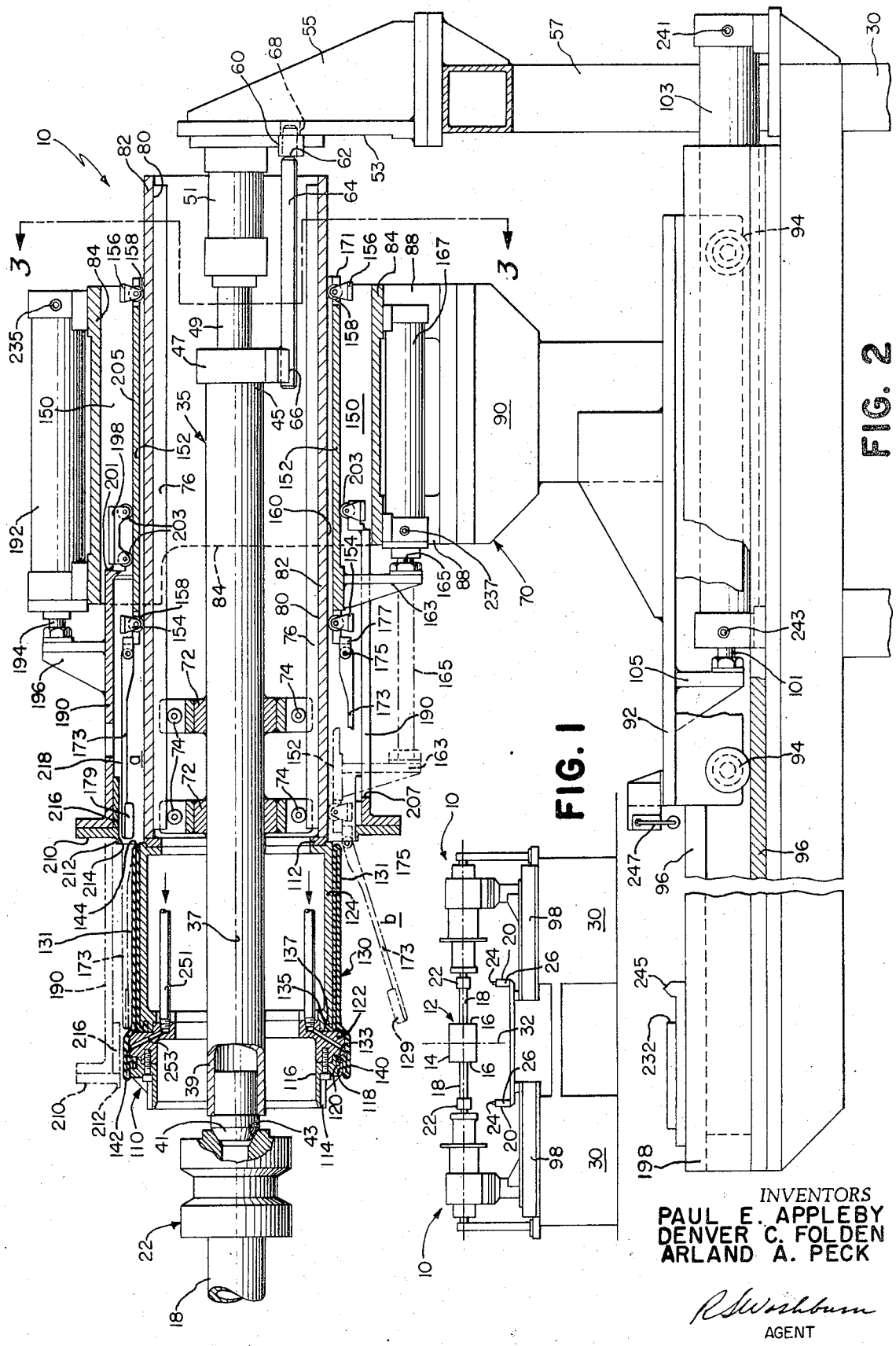

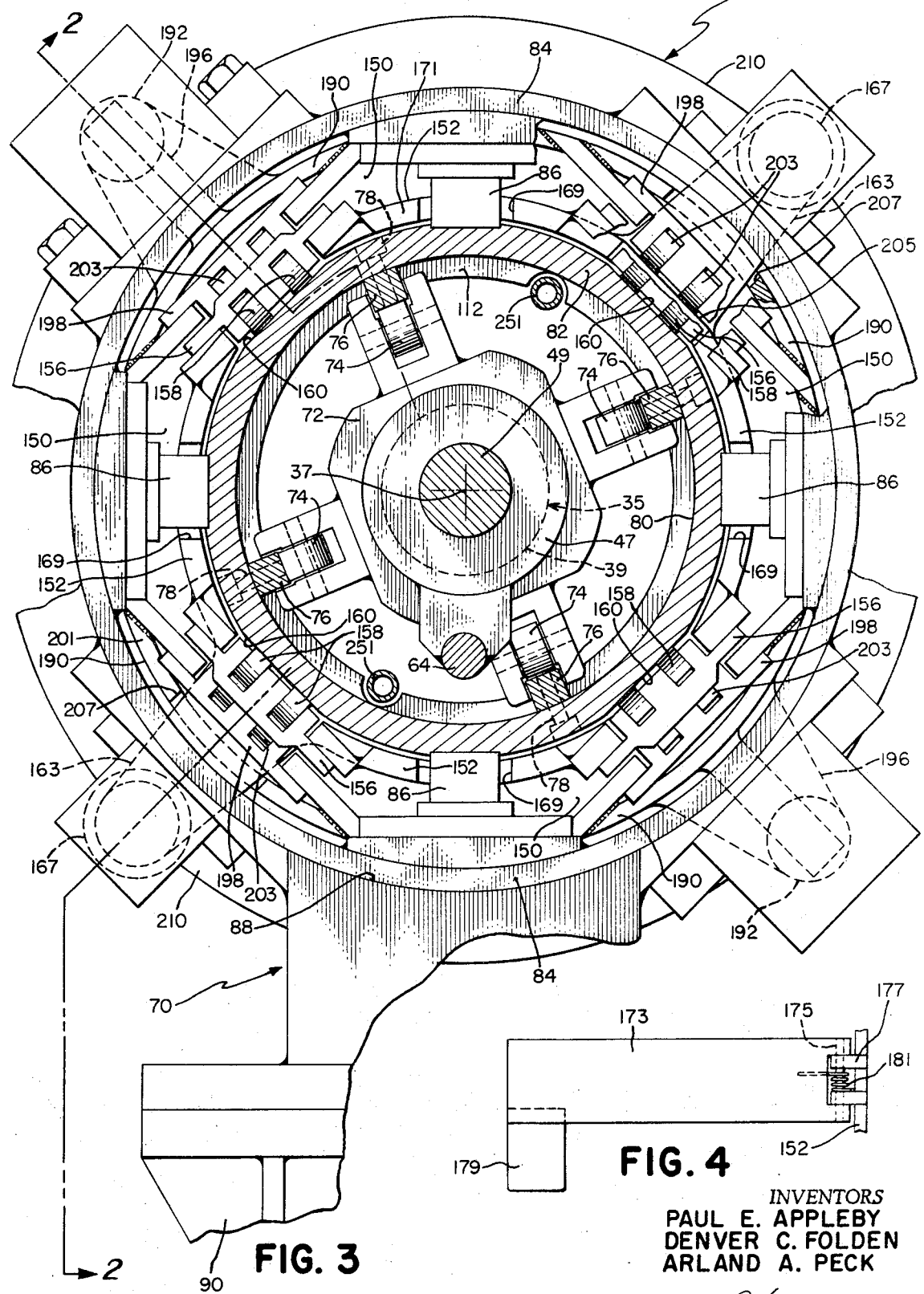

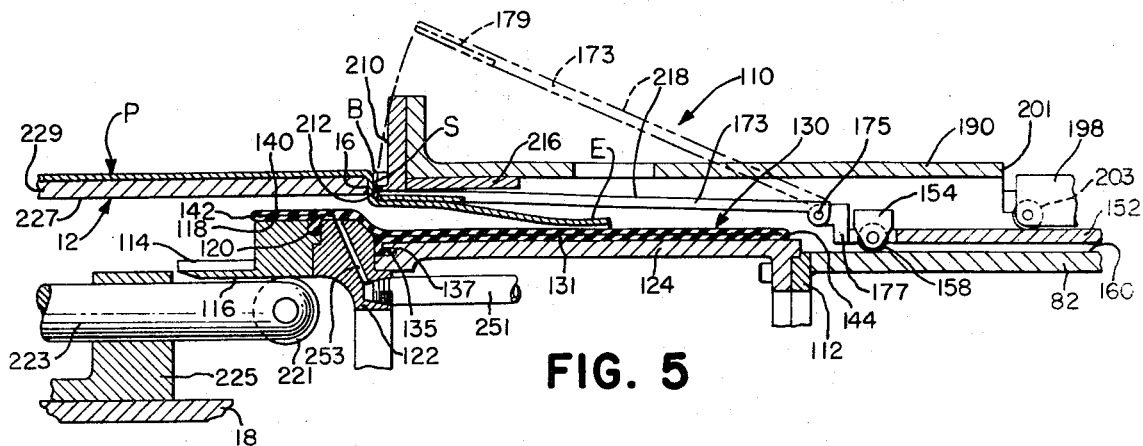

3,676,261
BEAD SETTING AND PLY TURNUP APPARATUS
Paul E. Appleby, Cuyahoga Falls, and Denver C. Folden and Arland A. Peck, Akron, Ohio, assignors to The Goodyear Tire & Rubber Company, Akron, Ohio
Filed July 6, 1970, Ser. No. 52,231
Int. Cl. B29h 17/22
U.S. Cl. 156—401                    7 Claims

ABSTRACT OF THE DISCLOSURE

The apparatus disclosed features mechanisms particularly useful in combination with a tire building machine having a plurality of stations, a conveyor, and a plurality of tire building drums movable by the conveyor between the stations wherein a component or components of a complete tire carcass are applied to each building drum. The disclosed mechanism includes a coaxially opposed pair of spindles which support a single tire building drum therebetween, a pair of carriages having bladder turnup assemblies fixed thereon surrounding the spindles for movement coaxially toward or away from the drum. A cylindrical sleeve integral with the carriage supports a sleeve carrying ply turndown fingers and a bead setter sleeve for placing a bead. Both the finger sleeve and the beadsetter sleeve are moved separately and relatively of the carriage and turnup assembly, the latter being movable axially over the fingers to move free ends thereof radially inwardly to form a bead receiving seat in a ply or plies at the shoulders of the building drum. The bead is held by the beadsetter against the seat while the bladder turnup is repositioned and then inflated to wrap the ply endings about the bead.

---

The foregoing abstract is not to be taken as limiting the invention of this application, and in order to understand the full nature and extent of the technical disclosure of this application, reference must be made to the accompanying drawings and the following detailed description.

This invention relates to tire building apparatus and particularly to mechanism for forming a bead receiving seat, setting a reinforcing ring or bead thereagainst and turning or folding tire carcass plies about such beads in tire carcasses.

A principal object of the invention is to provide a mechanism for forming a bead receiving seat by turning tire carcass ply endings radially inwardly relative to the cylindrical building surface of the building drum on which the carcass plies are wound, for setting a bead firmly against the so formed seat, and then wrapping the carcass ply endings progressively about the bead and into firm contact with the carcass inward of the bead.

An important object of the invention is the provision of a mechanism for making a bead assembly in a tire carcass which mechanism cooperates with a tire building apparatus employing a plurality of tire building drums movable successively through a plurality of stations in each of which one or more single components of a tire carcass are applied to each drum, the drums being moved from station to station in the apparatus by conveyors which transport the drums in a continuous closed path.

Further objects and advantages will become apparent or be particularly pointed out in the description which follows, making reference to the drawings attached in which:

FIG. 1 is an axial elevation view of apparatus according to the invention;

FIG. 2 is an enlarged view of the apparatus of FIG. 1, taken as indicated by the line 2—2;

FIG. 3 is a view in cross-section taken as indicated by the lines 3—3 in FIG. 2;

FIG. 4 is a detail view of an element of the apparatus of FIG. 1;

FIGS. 5, 6, 7, and 8 are partial, axial, cross-section views of the apparatus of FIG. 1, illustrating the operation thereof.

Making reference to the drawings and particularly to FIG. 1; the beadsetting and ply turning mechanisms 10 according to the invention are particularly useful in an apparatus for building tires which employs a plurality of tire building drums 12. Each drum has a tire building surface 14 terminating at each axial end in a shoulder 16 and a coaxial central shaft 18 which extends axially beyond the respective shoulders. The drums are supported and moved in the tire building apparatus through a plurality of tire component applying stations by a conveyor 20 which engages the bearers 22 mounted rotatably on the shafts. In the tire building apparatus with which the mechanisms 10 are cooperatively associated, the conveyor 20 comprises a pair of endless flexible parallel continuously movable members 24 on which the bearers carried by the central shaft are supported and moved. The members 24 are supported by a framework (not shown) which includes a pair of parallel longitudinally extending beams 26 which extend perpendicular to the plane of the view depicted in FIG. 1. The tire building apparatus includes suitable devices (not shown) to lift successive ones of the tire building drums from the conveyor at certain predetermined locations and to lower such drums successively again to the conveyor 20 for movement to a next succeeding station. In the tire building apparatus described, the two mechanisms 10 according to the invention serve as one of a plurality of such stations which cooperate to build complete tire carcasses.

The two substantially identical beadsetting and ply turnup mechanisms 10, one at the righthand, the other at the lefthand as seen in FIG. 1, are disposed on a suitable frame or base 30 symmetrically with respect to the mid-circumferential plane 32 of the drums.

Inasmuch as the two mechanisms 10 are substantially identical, a full description of one of them will suffice to provide a thorough understanding of both.

Referring particularly to FIGS. 2 and 3; each mechanism includes a horizontal spindle 35, the longitudinal axis 37 of which is collinear with the spindle of the other mechanism. The spindle tube 39 carries a coned plug 41 engageable with a coned seat 43 formed in the end of the central shaft 18 to support the drum 12 coaxially with the two spindles. The distal end 45 of the spindle tube is secured in a connector 47 and thereby to the ram 49 of an operating cylinder 51 fixed coaxially of the spindle upon the vertical face 53 of an L-bracket 55 mounted rigidly upon the upstanding portion 57 of the base 30. The operating cylinder 51 is connected conventionally to a suitable source of fluid pressure by which the ram and spindle can be extended to engage the coned plug with the tire building drum or to retract the spindle out of such engagement. Any suitable means to extend or retract the spindles can be substituted for the cylinders 51.

To prevent accidental or inadvertent retraction of the spindles 35 while a drum 12 is supported thereby, a safety block 60 is interposed between the vertical surface 53 of the L-block and one end 62 of a safety strut 64, the other end 66 of which is welded to the connector 47. The safety block can be withdrawn, by means (not shown) which is suitably interconnected to be actuated automatically at the appropriate time, to permit retraction of the spindle, permitting the strut 64 to enter the aperture 68 in the L-block.

To support the spindle 35 and provide for mobility of the carriage 70 about to be described, two collars 72 welded on the spindle tube each have four rollers 74 in rolling contact with longitudinal guide strips 76 fastened by cap screws 78 to the inner surface 80 of a rigid cylindrical sleeve 82 which is rigidly and concentrically mounted within a cylindrical body 84 by a plurality of stools 86 which are securely affixed to the outer wall of the sleeve and to pads welded at arcuate intervals to the inner wall of the body. The cylindrical body is welded in the saddles 88 of a pedestal 90 fixed rigidly on a member 92 having wheels 94 in rolling engagement with the guide tracks 96 formed in a track fixture 98 fastened to the upper surface of the base 30.

The rigid integral carriage 70, comprising the sleeve 82, the cylindrical body 84, the pedestal 90, and the member 92, is movable parallel to the spindle axis 37 by the piston rod 101 of a hydraulic cylinder 103 mounted on the base 30, the rod being fixed to a bracket 105 on the member 92. Movement of the carriage 70 moves the sleeve 82 coaxially of the spindle 35 and of the tire building drum 12 supported by the two coaxially opposed spindles.

A turnup bladder assembly 110 is mounted coaxially of the spindle rigidly on the frontal end 112 of the cylindrical sleeve 82 and is moved axially of the drum 12 by movement of the carriage 70. The bladder assembly includes a pilot ring 114 having inner and outer cylindrical surfaces 116, 118 respectively and an annular groove 120. The pilot ring is fastened concentrically to an intermediate ring 122 by cap screws, the intermediate ring being likewise fastened coaxially to the frontal end of the bladder support shell 124 which has an outside cylindrical surface of lesser diameter than the surface 118 of the pilot ring.

The turnup bladder 130 comprises an endless elastomeric membrane 131 having reinforcing cords extending therewithin between the forward annular bead 133 secured in the groove 120 and a second annular bead 135 secured in the annular groove 137, in the forward end face of the shell 124. From the bead 133 an inner wall of the nose portion 140 of the bladder extends axially toward the drum 12 to a folded edge 142 and thence axially outwardly to the outward folded edge 144 whence the membrane extends axially along the cylindrical surface of the support shell 124 to the groove 137.

In the annular space 150 formed between the cylindrical sleeve 82 and the cylindrical body 84 of the carriage 70 ply turndown means including the coaxial finger sleeve 152 is carried for axial telescoping movement toward and away from the building drum 12 by two sets of roller fixtures 154, 156, the rollers 158 of which roll on longitudinal track surfaces 160 spaced arcuately on the exterior surface of the cylindrical sleeve 82. A pair of arms 163 extended oppositely outwardly from the finger sleeve 152 are connected respectively to the piston rods 165 of the fluid operated cylinders 167 which are connected conventionally to a source of pressure fluid, preferably air. The cylinders 167 are fixed to the exterior surface of the cylindrical body 84.

Longitudinal slots 169 in the finger sleeve 152 extend axially toward the drum from the distal end 171 to accommodate the stools 86 during relative movement of the sleeve 152 in the annular space 150 between the body 84 and the carriage sleeve 82.

For turning radially inwardly over the shoulders 16 of the drum the overhanging edge of a ply or plies wrapped about the drum, the ply turndown fingers 173 are mounted swingably each on a pivot pin 175 carried in a bifurcated bracket 177 secured on the forward end of the sleeve 152. An arcuate segment 179 of sheet metal or the like is attached transversely to the inner surface of each finger, the segment arc conforming generally to arcuate surfaces of the overhanging plies. The fingers 173 are swingable in radial planes relative to the spindle axis between a generally cylindrical formation as illustrated at *a* in FIG. 2, and a conical formation shown in phantom at *b* in FIG. 2, toward which they are urged by torsion springs 181 mounted about the pivot pins 175. The base of the cone formed by the extended fingers is open toward the building drum 12 to a circumference sufficiently greater than the drum circumference to permit the fingers 173 and the segments 179 to encompass overhanging lateral edges of the plies wrapped on the drum. In the cylindrical formation *a* of the radially retracted fingers the same are accommodated in the annular space overlying bladder support sleeve 124 and the deflated bladder.

For setting a tire bead to the seat formed by the ply turndown means, a coaxial beadsetter sleeve 190 is axially movable in the annular space 150 between the finger sleeve 152 and the cylindrical body 84 and is movable relative to the carriage 70 by operation of the fluid pressure cylinder operators 192, the piston rods 194 of which are secured to extension arms 196 extending outwardly and oppositely from the beadsetter sleeve 190. Four roller fixtures 198 secured to the distal ends 201 of the beadsetter sleeve have rollers 203 which roll on the tracks 205 formed in the external cylindrical surface of the finger sleeve 152 at angularly spaced intervals. The arms 163 of the finger sleeve 152 extend through longitudinal openings 207 in the wall of the beadsetter sleeve 190 which are elongated to accommodate relative axial movement between the finger sleeve 152 and the beadsetter sleeve 190.

A beadsetting ring and bladder pushing flange 210 has an annular projection 212 which receives and temporarily holds a tire bead B for application to the tire carcass as will be subsequently discussed in greater detail. The inner cylindrical surface 214 of the flange and of the bushing 216 engage the radially outer surfaces 218 of the respective fingers 173 to hold the same retracted in cylindrical array. Operation of the cylinder 167 to move the finger sleeve 152 forwardly relative to the beadsetter sleeve 190 extends the fingers axially from the sleeve allowing the springs 181 to urge the fingers into the conical configuration indicated by the phantom outline *b* of FIG. 2.

Turning to FIGS. 5 through 8; a tire building drum 12 with a ply P or plies wrapped thereon is moved by an elevating device (not shown) into coaxial alignment with the spindles 35. At least one ply wrapped on the drum is of a width greater than the width of the drum between the shoulders 16 so that edges E of the ply P extend axially outwardly of the shoulders. The spindles 35 are extended to engage the centers 41 in the seats 43 to support the building drum coaxially of the spindles. Each drum is provided with a plurality of partispherical pilot rollers 221 each carried in an axially adjustably fixed roller mounting stem 223 mounted on the hub 225 of the drum. The rollers 221 are disposed radially between the inward surface 227 of the retractable drum segments 229 and the shaft 18 so that the arc surfaces of the rollers 221 roll axially along the inner cylindrical surface of the pilot ring 114.

The carriage 70 is moved axially forward toward the drum with the beadsetter sleeve 190 and the finger sleeve 152 initially both retracted into their rest or remote positions as illustrated in FIG. 2. During the forward movement of the carriage, the finger sleeve 152 is extended, allowing the fingers 173 to splay open into the conic array *b*, previously described, so that their free ends and the segments 179 thereon are disposed at radial distances greater than the radius of the cylindrical surface 230 of the building drum, placing the fingers to surround the ply P or plies which extend from and overhang the drum shoulder 16. The carriage movement is stopped by an adjustable stop 232 so that the swinging fingers will pass the drum shoulder 16 sufficiently to accommodate the thickness of the ply or plies, as well as turn the same radially inwardly of the shoulder, compressing the overhanging ply portions E circumferentially, to form a bead receiving seat S. The forward movement of the carriage 70 engages the pilot ring 114 with the pilot rollers 221 while placing the forward edge 142 and nose portion 140 of the bladder axially inwardly of the shoulder 16.

With the finger sleeve 152 extended to its maximum forward movement relative to the bladder assembly 130 and the forward movement of the carriage 70 stopped, as described above, the beadsetter sleeve 190 with the bead B held thereon is then moved axially toward the drum by operation of the cylinders 192. The cylindrical inner surface 214 urges the fingers acruately inwardly toward their cylindrical configuration, illustrated by FIG. 5, sweeping the ply or plies radially inwardly at the shoulder and compressing the same circumferentially to form the bead receiving seat S. The beadsetter sleeve 190 continues its forward movement without interruption to set the bead firmly on the seat. The continued radially inward movement of the segments 179 while the bead is moved axially thereover, tends to draw the ply endings E snugly about the shoulder 16 as the bead is moved into contact with the seat.

The bead is urged firmly against the seat by the high pressure fluid supplied to the head end 235 of the cylinder operator 192 while air pressure is applied to the rod end of the cylinder operator 167 to retract the finger sleeve 152 axially deeper into the beadsetter sleeve so that the wheel fixtures 154 abut the wheel fixture 198 of the beadsetter sleeve.

Fluid pressure to the carriage operating cylinder 103 is then reversed, from its head end 241 to its rod end 243, to move the carriage in a direction avially outwardly away from the drum, to an intermediate position of the carriage in which the forward edge 142 of the bladder is located at a predetermined axial distance D from the respectively associated seat S and contacting face of the bead B. The location of the forward edge of the bladder denoted by the dimension D can best be determined experimentally to achieve the maximum tightness of the wraparound of the plies turned about the bead. The carriage is stopped in the appropriate location by the engagement of an adjustable trip 245 with a limit switch 247 (shown in FIG. 2) which operates to close the hydraulic circuit to both ends 241, 243 of the carriage operating cylinder 103, locking the piston thereof between relatively incompressible columns of oil in a well known manner.

During outward movement of the carriage from the ply turndown position as described to the intermediate position determined by the trip 245, the high pressure fluid continues to be supplied to the beadsetter sleeve operating cylinder head end 235 to maintain the bead B axially against the seat S to prevent the movement of the bladder assembly 130 from moving the ply P sufficiently to disturb the relative positions of the bead and the seat.

The beadsetter sleeve 190 is then at least partially retracted axially away from the drum, the fingers 173 being maintained relative to the beadsetter sleeve 190 in the position seen in FIG. 6 by the pressure applied to the rod end 237 of the finger sleeve operating cylinder.

With the beadsetter sleeve 190 and the fingers 173 moved axially away from the drum 12 a sufficient distance to clear at least a part of the turnup bladder 131, the bladder is inflated by air under pressure from a suitable source, by way of the pipe 251 and the passage 253 in the intermediate ring 122, to turn the entire circumference of the ply ending E progressively about the bead B. While the bladder is being inflated, the beadsetter sleeve and pusher flange 210 is again moved forward axially toward the drum to engage an annular portion 260 of the bladder. The flange 210 continues its forward movement to roll the bladder 131 over the bead B and the adjacent portion of the drum 12 so that the ply endings E are firmly pressed onto the ply P extending between the shoulders 16. The beadsetter sleeve 190 is there- upon retracted, axially outwardly away from the drum, the bladder 131 is deflated by exhausting the air therefrom causing the same to return to its deflated shape. With the beadsetter sleeve 190 and finger sleeve 152 retracted into their remote or rest positions, the carriage 70 is moved axially outwardly to its position remote from the drum. The drum lifting device is then moved into position to receive the weight of the drum 12, the spindles 35 are retracted and the drum returned to the conveyor 20 whereupon the beadsetting and ply turning mechanisms 10 are ready to repeat the cycle described.

While certain representative embodiments and details have been shown for the purpose of illustrating the invention, it will be apparent to those skilled in the art that various changes and modifications may be made therein without departing from the spirit or scope of the invention.

What is claimed is:

1. A tire building apparatus comprising a tire building drum having shoulders, a carriage assembly movable axially of said drum, a bladder turnup assembly affixed on and movable with said carriage assembly coaxially of said drum, a beadsetter ring carried by and mounted for movement relative to said carriage assembly, ply turndown means mounted for coaxial movement on said carriage assembly to turn overhanging edge portions of a ply or plies radially inwardly over the respectively associated shoulder in response to relative movement between said beadsetter ring and said carriage assembly, fluid pressure means to move said beadsetter ring and a bead thereon to urge the same toward said shoulder with a ply or plies therebetween while said carriage assembly and said turnup assembly are moved axially outwardly of said drum.

2. A tire building apparatus comprising a tire building drum having a rigid cylindrical building surface terminating in shoulders and about which a ply or plies can be wrapped with an edge or edges thereof overhanging said shoulders, a bladder turnup assembly operatively associated respectively with each of said shoulders and movable between a location wherein the forward edge of the bladder is disposed coaxially and radially inwardly of the respectively associated shoulder and of said edge or edges and a second location remote from said drum, a plurality of ply turndown fingers mounted for coaxial movement relative to said drum and relatively of said bladder turnup assembly and for radial movement between a first position radially outward of and encompassing said ply edge or edges and a second position radially inward of said shoulder to fold said ply edge or edges radially inwardly over said shoulder by movement between said first and said second positions, and a beadsetter ring movable coaxially of said drum to cause said movement of said fingers from said first to said second positions while moving a bead coaxially toward the respectively associated shoulder with said ply edge or edges thereover and to hold said bead fixedly thereagainst while said fingers are moved axially away from said shoulder.

3. A beadsetting and ply turning mechanism for a tire building apparatus having a plurality of tire building drums each with a tire building surface terminating at each axial end in a shoulder, said mechanism comprising a rigid frame, a pair of coaxially opposed spindles mounted on said frame for axial movement toward each other to engage and support one of said drums coaxially therebetween and away from each other to permit successive ones of said drums to be moved out of and into coaxial alignment with said spindles, a pair of carriages mounted on said frame for movement parallel to said spindles, each carriage having a turnup bladder fixed axially thereon and disposed coaxially about one of said spindles, carriage moving means connected to each carriage to move said carriages in mutually opposite directions between respectively remote positions wherein each said bladder is located axially outwardly of said one drum and axially inward positions wherein the forward edge of each said bladder is disposed axially inwardly of the respectively associated shoulder, adjustably fixed stop means respectively cooperating with said carriage moving means to locate the respective bladder at a third position intermediate said remote and said inner position and wherein said edge of the respective bladder is in predetermined axial relation with said shoulder, a bead set ring mounted on said carriage for movement relative thereto coaxially of said one drum, fluid pressure operating means for effecting relative movement between said turnup bladder and said bead set ring, a plurality of ply turndown fingers mounted for axial movement on each of said carriages for movement relative thereto coaxially of said one drum, fluid pressure operating means for effecting relative movement between said carriage and said fingers and selectively operable to move said fingers axially relatively of said bead set ring and in unison therewith.

4. Apparatus as claimed in claim 3, including fluid pressure operating means operable selectively to move said spindles toward each other to engage and support said drum therebetween and away from each other to release said drum.

5. Apparatus as claimed in claim 4, including safety lock means engageable with means on said spindle to prevent axially outward movement thereof relative to said drum and movable to release said spindle for axially outward movement.

6. A tire building apparatus comprising a main frame, a tire building drum assembly including a plurality of pilot rollers therewithin, a pair of coaxially opposed spindles mounted on said frame and extendable toward each other to receive and support a drum therebetween and retractable to release said drum, a pair of carriage assemblies carried by said frame for movement parallel to said spindles toward and away from each other, each said carriage assembly including a coaxially disposed pair of cylindrical members mounted rigidly thereon, said members including an inner cylindrical sleeve and an outer cylindrical body each coaxial with said spindle and having an annular space therebetween, a bladder turnup assembly including an annular inflatable bladder affixed coaxially on said inner sleeve at the end thereof oriented towards said drum and a pilot ring engageable with said rollers, a first carrier sleeve mounted for coaxial movement on and relative to said inner sleeve and in said annular space, a plurality of ply turndown fingers mounted in generally equally spaced circular array upon said carrier sleeve to extend therefrom toward said drum for swing movement between a first position wherein said fingers are moved together into a generally cylindrical array and a second position wherein said fingers are splayed open into a generally conical array opening toward said drum, an arcuate wiper segment affixed on the free end of each said finger and cooperable with wiper segments respectively affixed on each immediately adjacent finger to encompass completely the ply or plies extended axially outwardly of the shoulders of said drum, a second carrier sleeve mounted for coaxial movement on and relative to said first carrier sleeve and in said annular space, a bead locating ring mounted coaxially on the end of said second sleeve for receiving and holding temporarily a bead for movement into engagement with a ply on said drum assembly, an annular radially extending flange on said second carrier sleeve, said first carrier sleeve being axially retractable into said second carrier sleeve sufficiently to place the free ends of said fingers completely within said second sleeve, said second carrier sleeve being extendable axially inwardly toward said drum a distance sufficient to engage said bladder during the inflation thereof to roll the bladder over the proximate end of the drum, said bead locating ring being movable toward the respective shoulder of said drum with a bead and a ply or plies therebetween while the first said carrier sleeve and said fingers and the ply turnup assembly are each moved axially outwardly.

7. A beadsetting and ply turning mechanism for tire building apparatus comprising a coaxially opposed pair of spindles each movable toward the other to engage and support a tire building drum therebetween, a carriage having a rigid cylindrical sleeve coaxially surrounding one of said spindles and movable axially toward and away from said drum, a turnup bladder assembly fixed coaxially on said sleeve and having a bladder which while deflated has a generally cylindrical nose portion movable axially into the end of said drum and an axially outward cylindrical portion of lesser diameter than said nose portion, beadsetter means coaxially surrounding said rigid sleeve and mounted for telescopic movement therealong, ply turndown means including a second sleeve coaxially movable axially inwardly of said bladder and disposed radially inwardly of said beadsetter means and outwardly of said rigid carriage sleeve and a plurality of ply turndown fingers swingably mounted axisymmetrically on said second sleeve, first fluid pressure means to move said ply turndown means axially relative to said bladder assembly and to said beadsetter means, and second fluid pressure operated means to move said beadsetter means axially relative to said ply turndown means to swing said fingers radially inwardly into a generally cylindrical formation overlying said portion of lesser diameter of said bladder.

References Cited
UNITED STATES PATENTS

| | | | |
|---|---|---|---|
| 3,438,832 | 4/1969 | Cantarutti | 156—401 |
| 3,560,301 | 2/1971 | Cantarutti | 156—401 |
| 2,319,643 | 5/1943 | Sternad et al. | 156—396 |

STEPHEN C. BENTLEY, Primary Examiner

U.S. Cl. X.R.

156—403